June 12, 1934. C. M. TURSKY Re. 19,210

FLUID COMPRESSOR

Original Filed Sept. 4, 1931 3 Sheets-Sheet 1

INVENTOR:
CHARLES M. TURSKY,
BY Arthur E. Lange,
Attorney.

June 12, 1934. C. M. TURSKY Re. 19,210
FLUID COMPRESSOR
Original Filed Sept. 4, 1931 3 Sheets-Sheet 2
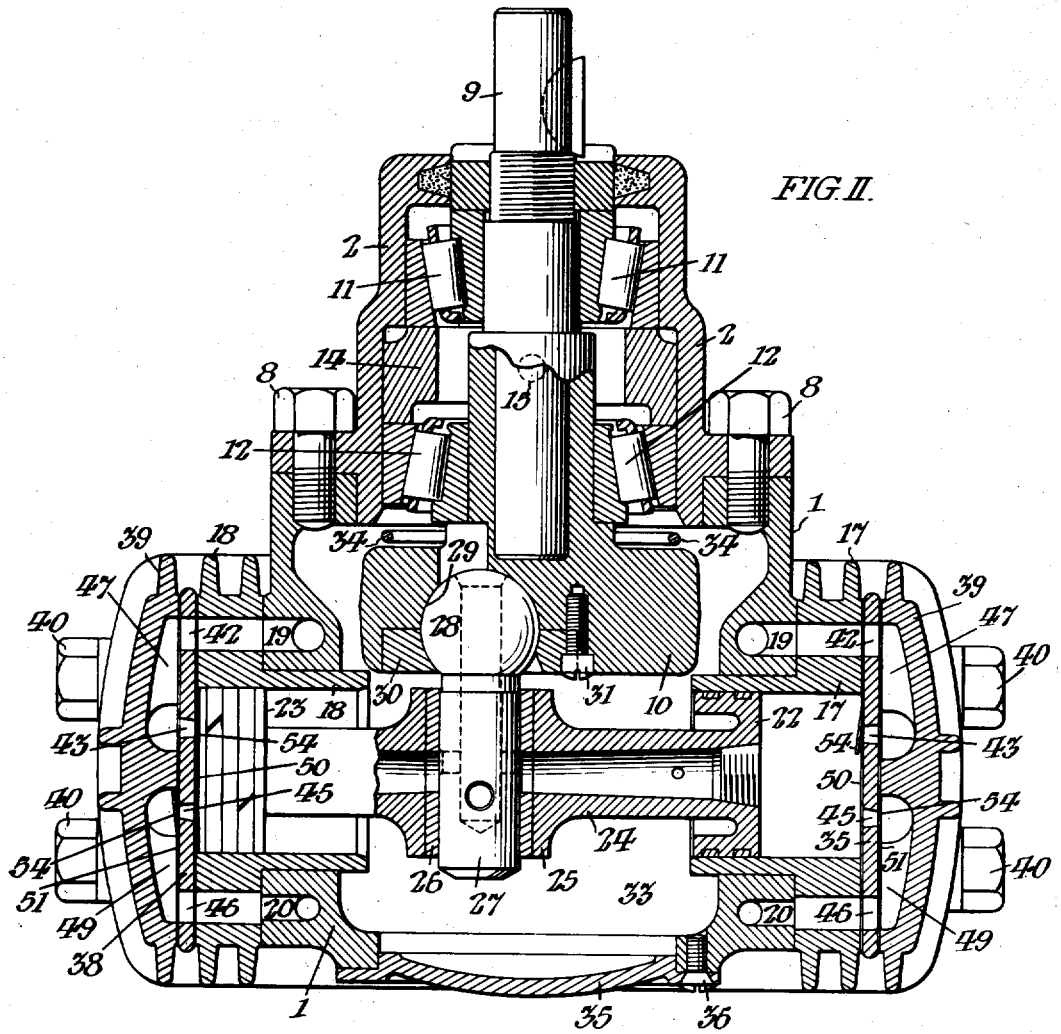
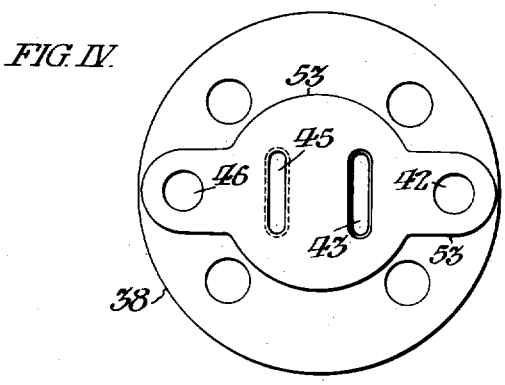
INVENTOR:
CHARLES M. TURSKY,
BY Arthur E. Paige,
Attorney.

June 12, 1934. C. M. TURSKY Re. 19,210
FLUID COMPRESSOR
Original Filed Sept. 4, 1931 3 Sheets-Sheet 3
FIG. III.
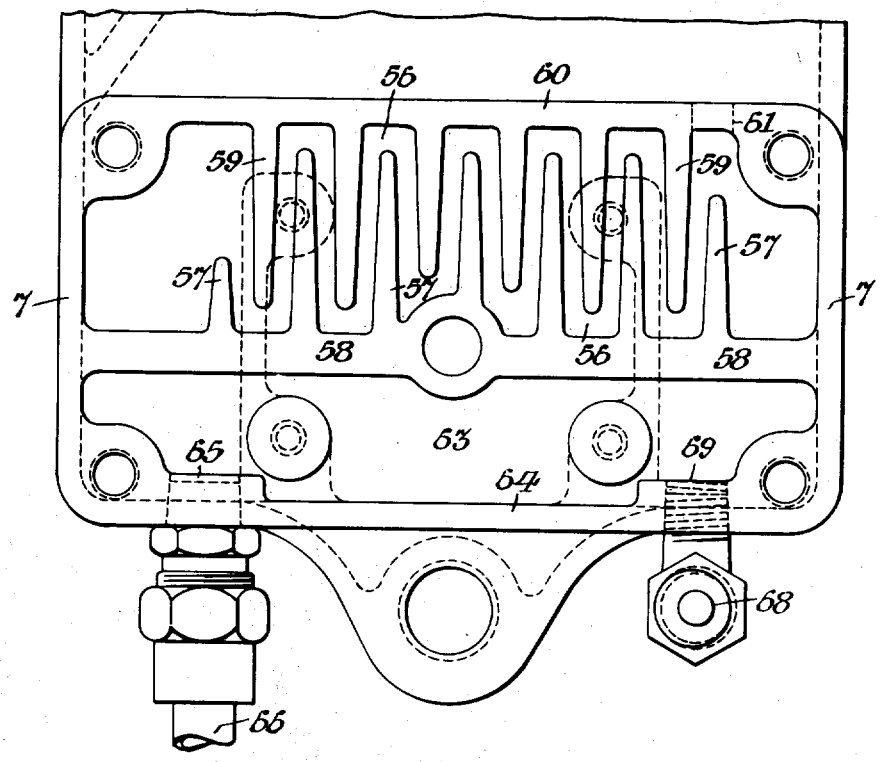
FIG. V.
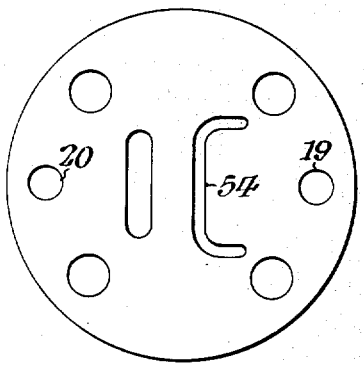
FIG. VI.
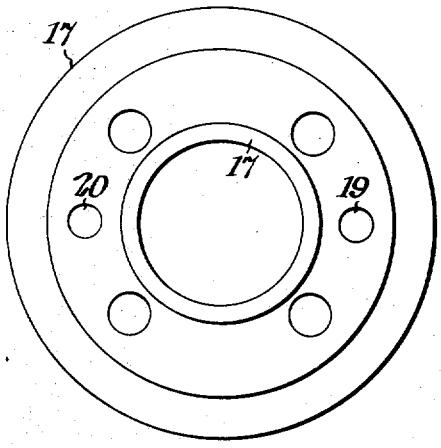
INVENTOR:
CHARLES M. TURSKY,
BY Arthur E. Lange
Attorney.

Reissued June 12, 1934

Re. 19,210

UNITED STATES PATENT OFFICE 19,210

FLUID COMPRESSOR

Charles M. Tursky, Philadelphia, Pa.

Original No. 1,880,595, dated October 4, 1932, Serial No. 561,193, September 4, 1931. Application for reissue April 17, 1933, Serial No. 666,567

23 Claims. (Cl. 230—185)

Figure 1:
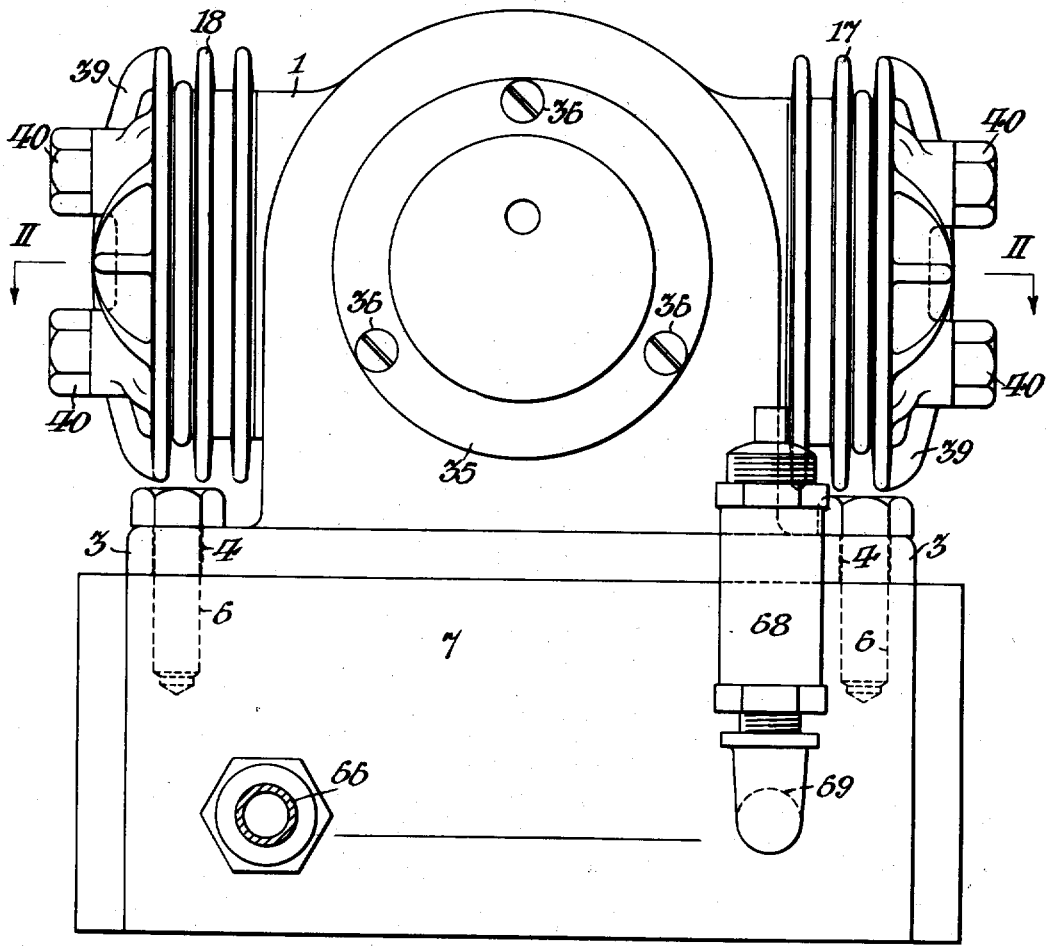

This invention relates to apparatus of the type forming the subject matter of Letters Patent of the United States granted to me and respectively Nos. 1,371,624 dated March 15, 1921; 1,478,929 dated December 25, 1923; and 1,533,958 dated April 14, 1925; wherein a pair of axially alined rigidly connected pistons are adapted to be reciprocated by a crank member carried between said pistons and fitted to reciprocate transversely to the axis of said pistons and having at its outer end a ball fitted in a socket in an eccentric mounted to rotate on an axis at right angles to the axis of said pistons.

My present improvement relates particularly to means for automatically controlling the intake and exhaust of fluid from cylinders in which said pistons are mounted to reciprocate, and including valves formed of thin plane sheet metal, each valve preferably including a plurality of stampings which are precisely alike; the valves for the intake and exhaust being precisely alike but disposed in reversed relation with reference to a valve seat plate containing the inlet and outlet ports.

My invention includes the various novel features of construction and arrangement hereinafter more definitely specified.

In said drawings, Fig. I is an end elevation of a fluid compressor embodying my invention.

Fig. II is a plan sectional view of said compressor taken on the line II, II, in Fig. I.

Fig. III is a plan view of the base plate shown in Fig. I.

Fig. IV is an elevation of said valve seat plate.

Fig. V is an elevation of one of the plane stamped sheet metal valve disks which, as shown in Fig. II, are clamped upon opposite sides of said valve seat plate.

Fig. VI is an elevation of one of the similar separable cylinders shown in section in Fig. II.

In said figures; the compressor casing comprises two separable sections 1 and 2, the base section 1 having the pedestal flanges 3 with four holes 4 for bolts 6 by which it may be rigidly connected with any suitable support, preferably the base plate 7. The section 2 is detachably rigidly connected with the section 1 by the four bolts 8.

Said casing section 2 supports the crank shaft 9 which is rigidly connected with the crank head 10. Said shaft and head are journaled in said section 2 independently of said casing section 1. As shown in Fig. II, said shaft 9 and head 10 are provided with respective thrust bearings comprising the respective series of rollers 11 and 12. Said bearings are held in properly axially spaced relation by the spacing ring 14 between them, said ring being held in said section 2 by the set screw 15 indicated in Fig. II.

Said casing section 1 carries axially alined and spaced cylinders 17 and 18 which are precisely alike but disposed in opposite relation with respect to the fluid inlet ports 19 and fluid outlet ports 20.

The pair of pistons 22 and 23, which are respectively mounted to reciprocate in said cylinders 17 and 18, are rigidly connected in spaced relation by the rod 24 which has the crank pin bearing 25 transverse to the common axis of said pistons. Said bearing 25 is provided with the bearing bushing 26 in which the crank pin 27 is mounted to reciprocate. Said pin 27 has the ball end 28 fitted in the ball socket 29 in the crank head, as shown in Fig. II. The ball socket plate 30 is complementary to said socket 29 and is detachably secured in said head 10, conveniently by three screws 31, in a circumferential series.

The crank chamber 33 within said casing section 1 is conveniently utilized as a receptacle for a body of lubricating oil in the lower part thereof. The loose ring 34 which encircles said shaft 9 and said crank head 10 dips into that oil and lifts it as the shaft turns to lubricate the latter and the bearings associated therewith. The interior of said chamber 33 is accessible upon removal of the door plate 35 which is, however, normally secured in the closed position shown in Fig. II, by a circular series of screws 36.

The valve seat plates 38 which are respectively located at the outer ends of said cylinders 17 and 18 are precisely alike and held in rigid relation with said casing section 1 by the cylinder heads 39 and the four bolts 40 extending through each into threaded engagement with said casing section 1. Each of said valve seat plates has two fluid inlet ports 42 and 43 and two fluid outlet ports 45 and 46. Said inlet ports 42 register with the ports 19 which extend through the annular flanges on said cylinders 17 and 18 and are in communication with the ports 43 in said valve seat plates by way of the recesses 47 in said cylinder heads 39. Said fluid outlet ports 46 register with the outlet ports 20 which extend through said annular flanges on said cylinders and are in communication with the ports 45 through the recesses 49 in said heads.

Said fluid inlet ports 43 are controlled by valves 50 each conveniently composed of three extremely thin stamped sheet metal disks mounted upon the respective inner faces of said valve seat plates 38 and clamped at their perimeters between said plates and the adjacent annular flanges on the cylinders 17 and 18. The outlet ports 45 are controlled by valves 51 each conveniently composed of three extremely thin stamped sheet metal disks mounted upon the respective outer faces of said valve seat plates 38 and clamped at their perimeters between said plates and the respectively local cylinder heads 39.

Referring to Fig. IV, each of said valve seat plates 38 is slightly reduced in thickness, upon both sides, between its perimeter and the line 53 so that said valves 50 and 51 bear only upon the areas within said lines 53 which surround the ports 42, 43, 45, and 46. All of said valve disks 50 and 51 are punched alike and, as shown in Fig. V, each includes a flexible flap 54, but said flaps of the valve disks 50 normally cover the inlet ports 43 in the valve seat plates 38, whereas, said flaps 54 of the valve disks 51 normally cover the outlet ports 45 in said valve seat plates 38. The construction and arrangement are such that said valve flaps 54 on the valves 50 are flexed inwardly to open the ports 43 as the pistons 22 and 23 move inwardly toward the axis of the crank shaft 9, and return to plane position, of their own resilience, closing said ports, when said pistons move away from the axis of said shaft 9. The valves 51 act reversely with respect to said valves 50, i. e., the flexible flaps 54 on the valves 51 are flexed outwardly to open the ports 45 as the pistons 22 and 23 move outwardly, away from the axis of said shaft 9; and said flaps are returned to plane position, of their own resilience, closing said ports 45 when the pistons 22 and 23 move toward the axis of the crank shaft 9. Thus said inlet ports 43 and 45 are alternately opened and closed by said valves; the valves 50 being open when the valves 51 are closed at each valve seat plate 38; but as the pistons 22 and 23 reciprocate together, the valve 50 is open at the cylinder 17 when the valve 50 is closed at the cylinder 18, and the valve 51 is closed at the cylinder 17 when the valve 51 is open at the cylinder 18. The effect of that arrangement is to supply compressed air at substantially constant pressure through the outlet ports 20, one of said ports being operative while the other is idle.

In order to suppress the whistling noise which would be incident to the direct admission of air from the outer atmosphere to said inlet ports 19; I prefer to mount the casing section 1 on the base plate 7, so that said ports register with the tortuous passageway 56 between the ribs 57 projecting from the wall 58 and the ribs 59 projecting from the wall 60 in said base plate, as shown in Fig. III; which passageway is in communication with the outer atmosphere through the port 61. When thus mounted; the outlet ports 20 from said casing section 1 communicate with the manifold chamber 63 between said wall 58 and the wall 64 in said base plate 7, from which the uniformly compressed air is discharged through the outlet port 65 in said wall 64 by way of the conduit 66 which, if the device is to be used for the inflation of automobile tires, may be provided with a flexible hose with the usual check valve on the end of it adapted for detachable engagement with tire valve stems.

I find it convenient to drive the crank shaft 9 by direct connection with the armature shaft of an electric motor and, in order to prevent destructive accumulation of pressure in the chamber 63 if the outlet therefrom is provided with a check valve as above contemplated; I prefer to provide said chamber 63 with the safety outlet valve 68 controlling the safety outlet port 69 in said wall 64. Said valve may be manually adjusted to any desired maximum pressure, for instance, one hundred and fifty pounds per square inch, and is effective to permit the escape of air from said chamber 63 if and when the pressure therein exceeds that for which said valve 68 is set.

The form of valves 50 and 51 above described is advantageous in that they are capable of operation, noiselessly, at a rate far in excess of that of which any reciprocatory valve is capable, and thus permit the use of a compressor and electric motor to drive it, both much smaller than is possible with any other type of valves to maintain any given pressure of fluid.

Moreover, the construction and arrangement shown avoid the necessity for pipe connections between the cylinders and the compresed fluid outlet manifold which is common to them and which are required by the construction and arrangement characteristic of the compressors of the prior art above contemplated. My invention thus not only materially lessens the cost of production of such compressors but avoids the possibility of leaks from such pipe connections.

In my copending application Serial No. 538,478 filed May 19, 1931, for Letters Patent of the United States for improvement in fluid compressors, I have shown a plane sheet metal valve which is a ring clamped at its perimeter and flexible throughout its inner circumference to open and close fluid inlet ports. My present invention is advantageous as compared with that, in that my improved valves control the ports by flexure of small flaps local to the ports, and the cost of production is minimized by making the valves of such form that they may be interchangeably utilized to control both the inlet and outlet ports.

Although as above described and with the valve seat plates 38 and their associated valve disks disposed as shown in Fig. II, rotation of the shaft 9 causes the device to take air from the outer atmosphere, compress it, and eject it through the conduit 66 under compression; mere reversal of said valve seat plates 38 with their associated valves suffices to change the device from a fluid compressor to a vacuum pump, without any other change in the construction or arrangement of the entire device. When thus changed, the apparatus would operate to intake fluid through the conduit 66, (connected with any container to be evacuated), and discharge to the atmosphere the fluid thus exhausted from the container.

Therefore, I do not desire to limit myself to the precise details of construction and arrangement herein set forth, as it is obvious that various modifications may be made therein without departing from the essential features of my invention, as defined in the appended claims.

I claim:

1. A fluid compressor valve consisting of a plane resilient metal plate having a port therethrough remote from the edge thereof; said port defining a flexible flap; said flap being flexible for permitting the passage of fluid through said port, in one direction, and preventing the passage of fluid through said port, in the opposite direction; said plate having another port therethrough remote from the edge thereof and from said first port for permitting fluid to freely pass through said plate in the opposite direction, and uncontrolled.

2. In a fluid compressor valve structure; the combination with a valve seat plate having two fluid ports therethrough remote from its edge; of two valves each including a plane resilient metal plate having a port therethrough remote from the edge thereof; said port defining a flexible flap; said flap being flexible for permitting the passage of fluid through said port, in one direction, and preventing the passage of fluid through said port, in the opposite direction; each valve having another port therethrough for permitting passage of fluid in a direction opposite to the direction of flow of fluid past said flap; said valves being in contact with the opposite faces of said valve seat plate and with their flaps respectively normally covering the respective ports through said seat plate; whereby passage of fluid through said seat plate in one direction is controlled by one of said valves and, in the opposite direction, by the other of said valves.

3. A valve structure as in claim 1; and a valve seat plate having two fluid ports therethrough remote from its edge respectively registering with the ports in said valve plate and including means for clamping together the perimeters of said seat plate and valve plate.

4. In a fluid compressor valve structure; the combination with a valve seat plate having two fluid ports therethrough remote from its edge; of two valves each including a plane resilient metal plate having a port therethrough remote from the edge thereof, defining a flexible flap; said flap being flexible for permitting the passage of fluid through said port, in one direction, and preventing the passage of fluid through said port, in the opposite direction; each of said valves having another port therethrough remote from the edge thereof and from said first port for permitting fluid to freely pass through said plate in the opposite direction, and uncontrolled; said valves being in contact with respectively opposite faces of said valve seat plate and with their flaps respectively normally covering and closing the respective ports through said seat plate; whereby passage of fluid through said seat plate in one direction is controlled by one of said valves and, in the opposite direction, by the other of said valves; and means for clamping said plate and valves together including a casing having separate fluid intake and outlet ports extending through it, respectively in communication with said ports in said seat plate; whereby the passage of fluid into and out of said casing is controlled by said valves.

5. A valve structure as in claim 4; and means in said casing for alternately subjecting the flaps of the respective valves to fluid pressure and thereby flexing said valves and releasing such pressure.

6. A valve structure as in claim 4; means in said casing for alternately subjecting the flaps of the respective valves to fluid pressure and thereby flexing said valves and releasing such pressure; and means for suppressing noise of admission of air to said casing including a base plate having a tortuous passageway registering with the fluid admission port in said casing, and in communication with the atmosphere remote from that inlet port.

7. A valve structure as in claim 4; means in said casing for alternately subjecting the flaps of the respective valves to fluid pressure and thereby flexing said valves and releasing such pressure; and means for suppressing noise of admission of air to said casing including a base plate having a tortuous passageway registering with the fluid admission port in said casing, and in communication with the atmosphere remote from that inlet port; said base plate having a manifold chamber in registry with the outlet port in said casing and provided with an outlet.

8. In a fluid compressor valve structure; the combination with a valve seat plate having two fluid ports therethrough remote from its edge; of two valves each including a plane resilient metal plate having a port therethrough remote from the edge thereof; said port defining a flexible flap; said flap being flexible for permitting the passage of fluid through said port, in one direction, and preventing the passage of fluid through said port, in the opposite direction, each valve having another port therethrough for permitting passage of fluid in a direction opposite to the direction of flow of fluid past said flap; said valves being in contact with the opposite faces of said valve seat plate and with their flaps respectively normally covering the respective ports through said seat plate; whereby passage of fluid through said seat plate in one direction is controlled by one of said valves and, in the opposite direction, by the other of said valves; and means for clamping together the perimeters of said seat plate and valves, including a head covering one of said valves in opposition to said seat plate, separating said flap controlled ports and including respective recesses in communication therewith and provided with respective fluid inlets and outlets.

9. In a fluid compressor valve structure; the combination with a valve seat plate having two fluid ports therethrough remote from its edge; of two valves each including a plane resilient metal plate having a port therethrough remote from the edge thereof; said port defining a flexible flap; said flap being flexible for permitting the passage of fluid through said port, in one direction, and preventing the passage of fluid through said port, in the opposite direction, each valve having another port therethrough for permitting passage of fluid in a direction opposite to the direction of flow of fluid past said flap; said valves being in contact with the opposite faces of said valve seat plate and with their flaps respectively normally covering the respective ports through said seat plate; whereby passage of fluid through said seat plate in one direction is controlled by one of said valves and, in the opposite direction, by the other of said valves; means for clamping together the perimeters of said seat plate and valves, including a head covering one of said valves in opposition to said seat plate, separating said flap controlled ports and including respective recesses in communication therewith and provided with respective fluid inlets and outlets; a casing having separate fluid intake and outlet ports extending through it, respectively in communication with said ports in said seat plate; and screw means engaging said casing, extending through said valves and seat plate and holding them in hermetically sealed relation at their perimeters.

10. A fluid compressor valve seat plate which is a circular disk having opposite plane faces; a fluid inlet port and a fluid outlet port; an inlet port at the margin of said plate adjacent said other inlet port; an outlet port at the margin of said plate adjacent said other outlet port; two valves, respectively fitted upon opposite sides of said valve seat plate, and each including a plane resilient metal plate having a port therethrough remote from the edge thereof, defining a flexible flap; said flap being flexible for controlling the passage of fluid through one of said ports remote from the perimeter of said plate; each of said valves having at the margin thereof ports therethrough for registering with the marginal ports in said valve seat plate; and means for clamping said plate and valves in cooperative relation, including a casing having separate fluid inlet and outlet ports extending through it respectively in communication with said marginal ports in said seat plate and valves, and a head covering one of said valves in opposition to said seat plate, separating said flap controlled ports and including respective recesses in communication therewith and in registry with the marginal ports through said valves and seat plate; and screw means extending through said head, valves, and seat plate, in engagement with said casing, clamping the margins thereof together in hermetically tight relation.

11. A fluid compressor valve consisting of a plane resilient metal plate having a port therethrough remote from the edge thereof, said port defining a flexible flap; said flap being flexible for permitting the passage of fluid through said port, from one direction, and preventing the passage of fluid through said port, in the opposite direction; and a port through said valve near the edge thereof adjacent said flap, for permitting fluid to freely pass through said plate in the opposite direction, and uncontrolled, and openings through the margin of said plate for fastening means, in symmetrical relation with both of said ports; whereby said plate may be selectively fitted to said fastening means with its controlled and uncontrolled ports in different positions.

12. A fluid compressor valve consisting of a plane resilient metal plate having a port therethrough remote from the edge thereof, said port defining a flexible flap; said flap being flexible for permitting the passage of fluid through said port, from one direction, and preventing the passage of fluid through said port, in the opposite direction; and a port through said valve near the edge thereof adjacent said flap; said valve having another port therethrough remote from the edge thereof for permitting the passage of fluid in a direction opposite to the direction of flow of fluid through said other port remote from the edge of said valve; and another port near the edge of said valve, adjacent to the second port remote from the edge of said valve.

13. A fluid compressor valve, consisting of a plurality of plane resilient metal plates each having a port therethrough remote from the edge theerof, and defining a flexible flap; each of said plates having a plurality of holes for fastening means near the edge thereof, in symmetrical relation with the ports in each of said plates; and fastening means extending through said holes for maintaining all of said plates with their flaps in registry with each other; whereby said plates may be selectively fitted to said fastening means with their ports in different positions with reference to said fastening means.

14. A convertible air compressor and vacuum pump including a cylinder having two air ports each adapted to be interchangeably constituted an air inlet or an air outlet; a removable valve plate at one end of said cylinder, carrying two valves which are circular plates of resilient metal of the same pattern, each having two air ports therethrough respectively controlled and uncontrolled by flaps and disposed in reversed relation and interchangeable with respect to said ports in said cylinder; and a piston for displacing the air in said cylinder.

15. An apparatus of the class described including cylinders each having two air openings; a piston having heads respectively operating in said cylinders and adapted to compress air or to operate as a vacuum pump, and a valve plate in each of said cylinders carrying two valves which are circular plates of resilient metal of the same pattern, each having two air ports therethrough respectively controlled and uncontrolled by flaps for alternately opening and closing said air openings by the movement of said piston; said valve plate being interchangeable in position to cause the piston and cylinders to compress air or to function as a vacuum pump.

16. An apparatus of the class described, including oppositely disposed cylinders, each having two air openings each adapted to be optionally constituted an air inlet or an air outlet; a piston having heads operating in both of said cylinders; and valve plates local to the respective cylinders, each provided with two valves which are circular plates of resilient metal of the same pattern, each having two air ports therethrough respectively controlled and uncontrolled by flaps and disposed in reversed relation to each other; said plates being changeable to constitute said apparatus a fluid compressor or vacuum pump.

17. In a fluid translating device, the combination of a cylinder, a cylinder head, a valve plate disposed between the cylinder and the head and having flat surfaces on opposite sides thereof, said valve plate having inlet and outlet ports opening into the respective flat surfaces, and flat sheet valve members lying flat against said surfaces having portions retained in fixed position and flap portions movable to and from the ports in the valve plate to provide therewith inlet and discharge valves.

18. In a fluid translating device, the combination of a cylinder, a cylinder head, a valve plate disposed between the cylinder and the head and having flat surfaces on opposite sides thereof, said valve plate having inlet and outlet ports opening into the respective flat surfaces, and flat sheet valve members lying flat against said surfaces having portions retained in fixed position and flap portions movable to and from the ports in the valve plate to provide therewith inlet and discharge valves, said valve members being interchangeable.

19. In a fluid translating device, the combination of a cylinder, a cylinder head, a valve plate disposed between the cylinder and the cylinder head and having flat surfaces on opposite sides thereof, said valve plate having an inlet port opening into one of said surfaces and an outlet port opening into both of said surfaces, and flat sheet valve members lying flat against said respective flat surfaces, said valve members including portions retained in fixed relation against the flat surfaces and movable flap portions cooperating with said inlet and outlet ports to form inlet and discharge valves, the valve member having the flap portion cooperating with the inlet port also having an aperture registering with the outlet port.

20. In a fluid translating device, the combination of a cylinder, a cylinder head, a valve plate disposed between the cylinder and the cylinder head and having flat surfaces on opposite sides thereof, said valve plate having an inlet port opening into one of said surfaces and an outlet port opening into both of said surfaces, and interchangeable flat sheet valve members lying flat against said respective flat surfaces, said valve members including portions retained in fixed relation against the flat surfaces and movable flap portions cooperating with said inlet and outlet ports to form inlet and discharge valves, each valve member having an aperture therein, the aperture of the valve member cooperating with the inlet port being in registry with the outlet port.

21. In a fluid translating device, the combination of a cylinder, a cylinder head, a valve plate disposed between the cylinder and the head and having flat surfaces on opposite sides thereof, said valve plate having inlet and outlet ports opening into the respective flat surfaces, and flat sheet valve members lying flat against said surfaces and having portions secured to the valve plate and flap portions movable to and from the ports in the valve plate to provide therewith inlet and discharge valves.

22. In a fluid translating device, the combination of a cylinder, a cylinder head, a valve plate disposed between the cylinder and the head and having flat surfaces on opposite sides thereof, said valve plate having inlet and outlet ports opening into the respective flat surfaces, and interchangeable flat sheet valve members lying flat against said surfaces and having portions secured to the valve plate and flap portions movable to and from the ports in the valve plate to provide therewith inlet and discharge valves, each valve member having an aperture therein, the aperture of the valve member adjacent the interior of the cylinder being in registry with the outlet port in the valve plate.

23. In a fluid translating device, the combination of a cylinder, a cylinder head, a valve plate disposed between the cylinder and the cylinder head and having flat surfaces on opposite sides thereof and a peripheral surface, said valve plate having an inlet port opening into the peripheral surface and into one of the flat surfaces and an outlet port opening into both of the flat surfaces, and flat sheet valve members lying flat against said respective flat surfaces, said valve members including portions retained in fixed relation against the flat surfaces and movable flap portions communicating with said inlet and outlet ports to form inlet and discharge valves, the valve member having the flap portion cooperating with the inlet port also having an aperture registering with the discharge port.

CHARLES M. TURSKY.